Nov. 20, 1923.
T. WATSON
ENDLESS TRACK LUG
Filed March 5, 1923
1,474,456
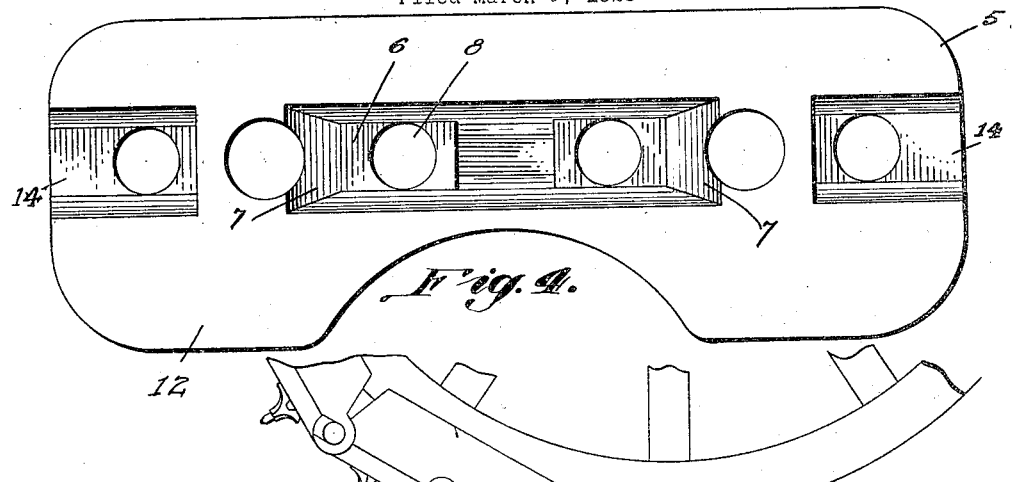
Fig. 4.
Fig. 1.
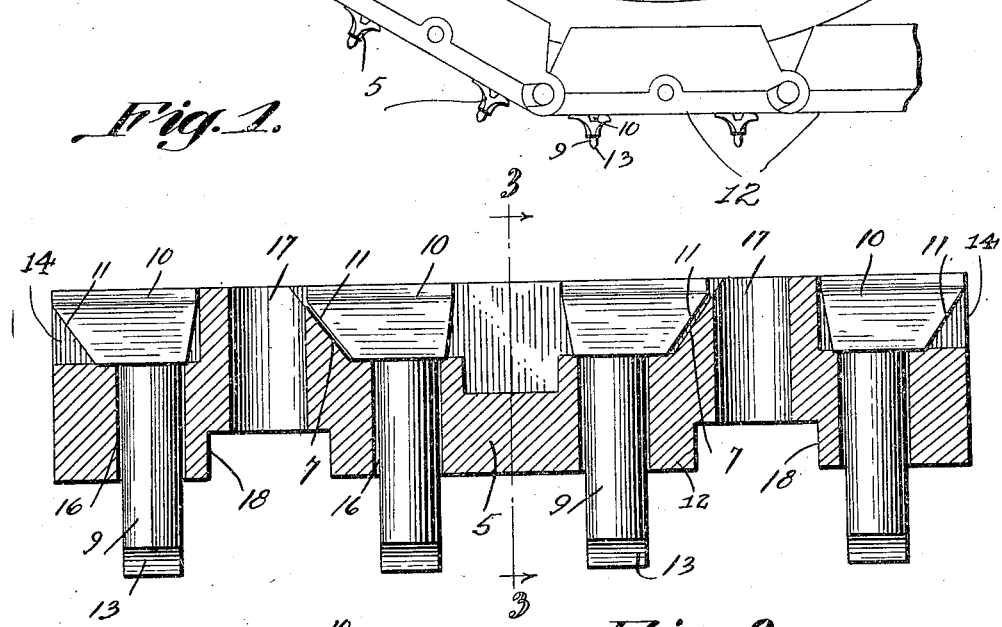
Fig. 2.
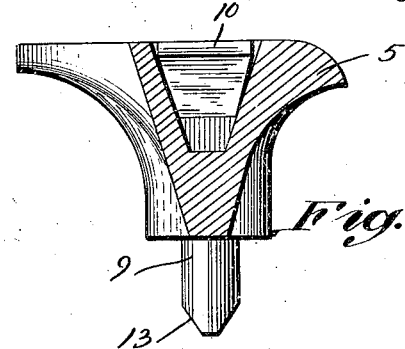
Fig. 3.
Thomas Watson,
Inventor.
Attorneys Patented Nov. 20, 1923.

1,474,456

UNITED STATES PATENT OFFICE.

THOMAS WATSON, OF RAY, MINNESOTA.

ENDLESS-TRACK LUG.

Application filed March 5, 1923. Serial No. 622,968.

*To all whom it may concern:*

Be it known that I, THOMAS WATSON, a citizen of the United States, residing at Ray, in the county of Koochiching and State of Minnesota, have invented a new and useful Endless-Track Lug, of which the following is a specification.

This invention relates to lugs to be used on endless tracks for tractors, the primary object of the invention being to provide novel means to be secured to the sections of the endless track to increase the traction qualities thereof.

Another object of the invention is to provide a device of this character which may be readily and easily removed for the replacement of the spikes forming a part thereof to facilitate the repair of the lug.

A further object of the invention is to provide a construction wherein the heads of the spikes will contact with the surface of the sections of the endless track, thereby eliminating the usual securing bolts employed for securing the spikes to the body portions of the lugs.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view of a wheel and endless track showing the lug as applied.

Figure 2 is a longitudinal sectional view through the lug.

Figure 3 is a sectional view taken on line 3—3 of Figure 2.

Figure 4 is a plan view of the lug, showing the spikes as removed.

Referring to the drawing in detail, the lug includes a body portion indicated generally by the reference character 5 which is formed preferably of a length equal to the width of the endless track section to which the same is applied, so that the ends of the lug lie flush with the side edges of the sections of the track.

The track engaging surface of the lug is formed with a central cut out portion 6 which has inclined walls 7 disposed adjacent to the ends thereof. Openings 8 are formed in the bottom wall of the central cut out portion and accommodate the spikes 9 of the lug, the spikes being provided with heads 10 that are also formed with inclined surfaces 11 adapted to contact with the inclined surfaces 7 of the cut out portion, to hold the spikes against lateral movement when in use.

These heads are relatively wide and contact with the ground engaging surfaces of the sections of the endless track, the sections being indicated by the reference character 12 thereby directing the weight of the tractor equipped with the lug, to the sections 12, and at the same time providing means for securing the spikes 9 against longitudinal movement within their openings. Thus it will be seen that due to this construction, the usual securing bolts employed for securing the spikes to lugs of this character have been eliminated.

The outer ends of the spikes 9 are shown as tapered as at 13, to cause the spikes to pierce the ground surface over which the tractor is moving, to increase the traction qualities of the endless track.

Disposed at the end of the body portion 5 are cut out portions 14 which are of depths equal to the thickness of the heads 10 of the spikes 9 disposed at the ends of the lug, openings 16 being provided at the ends of the body portion and communicating with the cut out portions 14 to accommodate the end spikes 9.

In order that the lug may be secured to the track sections of an endless track, openings 17 are provided, which openings are formed with enlarged cut out portions 18 to accommodate the heads of bolts, so that bolts, which are not shown, and which are employed for securing the lugs, will lie flush with the outer surfaces of the lugs.

It is to be understood that openings are formed in the sections of the endless track, to receive the securing bolts. From the foregoing it will be obvious that should it be desirable to repair the spikes when the same become worn or otherwise rendered inoperative, it is only necessary to remove the lugs whereupon the spikes may be readily withdrawn.

What is claimed as new is:—

In a lug of the class described, a body portion having a central elongated cut out portion and having lateral cut out portions, said central cut out portion having inclined end walls, said body portion having openings extending therethrough, spikes disposed within the openings and having heads, the heads of the spikes disposed within the central cut out portion having inclined surfaces contacting with the inclined walls of the cut out portions, and said spikes having tapered ground engaging portions.

In testimony that I claim the foregoing as my own, I have hereto affixed my signature in the presence of two witnesses.

THOMAS WATSON.

Witnesses:
MORTON O. MULSBY,
H. BACOR.